(12) United States Patent
Otsubo (10) Patent No.: US 11,630,323 B2
(45) Date of Patent: Apr. 18, 2023

(54) STEREOSCOPIC IMAGE DISPLAY DEVICE AND STEREOSCOPIC IMAGE DISPLAY METHOD

(71) Applicant: Asukanet Company, Ltd., Hiroshima (JP)

(72) Inventor: Makoto Otsubo, Hiroshima (JP)

(73) Assignee: ASUKANET COMPANY, LTD., Hiroshima (JP)

( * ) Notice: Subject to any disclaimer, the term of this patent is extended or adjusted under 35 U.S.C. 154(b) by 384 days.

(21) Appl. No.: 16/979,356

(22) PCT Filed: Dec. 10, 2019

(86) PCT No.: PCT/JP2019/048222
§ 371 (c)(1),
(2) Date: Sep. 9, 2020

(87) PCT Pub. No.: WO2020/122053
PCT Pub. Date: Jun. 18, 2020

(65) Prior Publication Data
US 2021/0003856 A1    Jan. 7, 2021

(30) Foreign Application Priority Data
Dec. 11, 2018    (JP) .............................. JP2018-231667

(51) Int. Cl.
*G02B 30/24*    (2020.01)
*H04N 13/302*    (2018.01)
*H04N 13/398*    (2018.01)

(52) U.S. Cl.
CPC ........... *G02B 30/24* (2020.01); *H04N 13/302* (2018.05); *H04N 13/398* (2018.05)

(58) Field of Classification Search
CPC .... G02B 30/24; G02B 27/2264; G02B 27/22; H04N 13/354
See application file for complete search history.

(56) References Cited

U.S. PATENT DOCUMENTS

2015/0054927 A1*    2/2015 Chen .................... H04N 13/383
348/56
2016/0165219 A1    6/2016 Tokuhara et al.
(Continued)

FOREIGN PATENT DOCUMENTS

CN    104104934 A    10/2014
CN    105531618 A    4/2016
(Continued)

OTHER PUBLICATIONS

International Search Report dated Mar. 3, 2020, issued in counterpart International Application No. PCT/JP2019/048222 (2 pages).
(Continued)

*Primary Examiner* — Yuzhen Shen
(74) *Attorney, Agent, or Firm* — WHDA, LLP (57) ABSTRACT

A stereoscopic image display device includes a display 11 divided into sections 13 in each of which displayed are small images 12a to 12d each having a plurality of minute images 14, a shutter panel 16 disposed in front of the display 11 and including first mechanical shutters 17, which are arranged side by side in units of the minute image 14 and time-divisionally divide each section 13 per each of the small images 12a to 12d by switching on and off in units of the minute image 14, and an image forming panel 23 including image forming means 24 arranged side by side for forming an image from light rays from each of the small images 12a to 12d passing through the first mechanical shutters 17 when the first mechanical shutters 17 are on.

8 Claims, 10 Drawing Sheets

(56) References Cited

U.S. PATENT DOCUMENTS

| | | |
|---|---|---|
| 2016/0198149 A1 | 7/2016 | Yuuki et al. |
| 2016/0275881 A1* | 9/2016 | Sugihara ................ G02B 26/08 |
| 2019/0068961 A1 | 2/2019 | Cao |
| 2019/0311665 A1 | 10/2019 | Liu |
| 2019/0317334 A1 | 10/2019 | Otsubo |

FOREIGN PATENT DOCUMENTS

| | | |
|---|---|---|
| CN | 107037623 A | 8/2017 |
| CN | 108259882 A | 7/2018 |
| CN | 108780297 A | 11/2018 |
| JP | 9-33858 A | 2/1997 |
| JP | 2003-50375 A | 2/2003 |
| JP | 2008-52010 A | 3/2008 |
| JP | 2014-022888 A | 2/2014 |
| JP | 2016-212373 A | 12/2016 |
| WO | 2017/114789 A2 | 7/2017 |
| WO | 2018/003555 A1 | 1/2018 |

OTHER PUBLICATIONS

Decision to Grant a Patent dated Apr. 7, 2020, issued in counterpart JP Patent Application 2020-513663, w/English translation (5 pages).
Office Action dated Apr. 27, 2021, issued in counterpart CN application No. 201980016080.0, with English Translation. (13 pages).

* cited by examiner

STEREOSCOPIC IMAGE DISPLAY DEVICE AND STEREOSCOPIC IMAGE DISPLAY METHOD

TECHNICAL FIELD

The present invention is related to a stereoscopic image display device and a stereoscopic image display method that enable a high-definition stereoscopic image (including a two-dimensional image) to be viewed with a similar feeling to everyday life without any use of special glasses.

BACKGROUND ART

Among various stereoscopic image display methods, the spatial image reproduction system, in which a stereoscopic image is formed in the air by using recorded data (images) of an optical spatial image of an object, has been conventionally deemed to be an ideal stereoscopic image display method.

Figure 10:
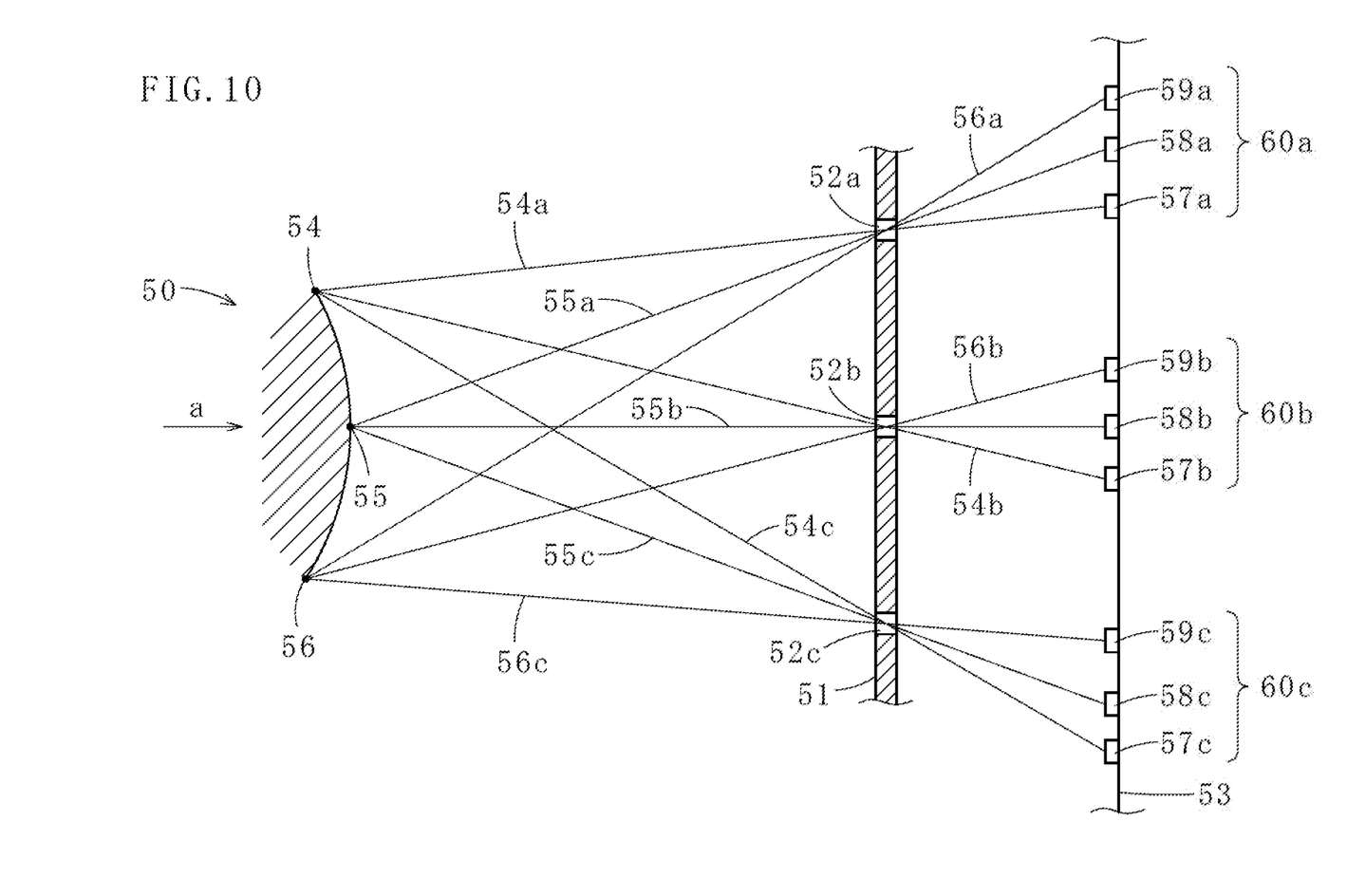
FIG. 10 is an explanatory figure for illustrating the principle of the spatial image reproduction system.

The principle of the spatial image reproduction system is explained below. As shown in FIG. 10, a light-blocking panel 51 is disposed in front of a three-dimensional object (an object) 50 with a predetermined space therebetween. The light-blocking panel 51 is provided with a plurality (three, in this explanation) of pinholes 52a to 52c formed. Further in front of the light-blocking panel 51, e.g., a light-sensitive film 53 is disposed in parallel with the light-blocking panel 51. Although an uncountable number of object points each emitting (reflecting) light rays are there on the surface of the three-dimensional object 50, we are going to look at three object points 54 to 56 in this explanation. Of an infinite number of the light rays emitted toward various directions from each of the object points 54 to 56, a light ray 54a, a light ray 55a, and a light ray 56a each passing through the pinhole 52a form on the light-sensitive film 53 a small image 60a composed of minute images 57a, 58a, and 59a. In the same manner, of an infinite number of light rays emitted toward various directions from each of the object points 54 to 56, a light ray 54b, a light ray 55b, and a light ray 56b each passing through the pinhole 52b form on the light-sensitive film 53 a small image 60b composed of minute images 57b, 58b, and 59b, whereas a light ray 54c, a light ray 55c, and a light ray 56c each passing through the pinhole 52c form on the light-sensitive film 53 a small image 60c composed of minute images 57c, 58c, and 59c. The light-sensitive film 53 is then replaced with a display (an image display panel) and light rays from each of the small images 60a to 60c pass through the pinholes 52a to 52c in a reversed manner from when the small images 60a to 60c were formed and form an image. This is how a stereoscopic image is formed (reproduced) at the position where the three-dimensional object 50 were. Here, if a viewer watches the stereoscopic image from a direction of an arrow a in FIG. 10, the concavity and convexity look reversed from those of the real three-dimensional object 50. To cope with this and correctly depict the concavity and convexity of the stereoscopic image, an image processing must be done when displaying the small images on the display. Also, if the pitch of the pinholes is wider, the small images become sparser which deteriorates the resolution and brightness of the reproduced stereoscopic image. Thus, in order to form a clear high-definition stereoscopic image, a large number of pinholes are necessary to be arranged throughout the length and the width, and the small images corresponding to each pinhole are necessary to be arranged in a high density and in an even manner. However, if the pitch of the pinholes becomes too narrow, the displaying areas of the adjacent small images overlap with each other. Thus, in this case, extra measures must be taken when displaying the small images.

As a method for displaying a clear stereoscopic image with a wider viewing angle adopting this spatial image reproduction system, e.g., in patent literature 1 a stereoscopic image display method is suggested, in which a display control panel having a large number of minute light-transmissive portions is provided and behind the display control panel disposed is a group of image display panels including a plurality of image display panels each displaying a large number of small images of an object each viewed from a position where each minute light-transmissive portion is provided. In this method, the minute light-transmissive portions are sequentially selected at a high speed to be light transmissive, and at the same time, the small images are displayed at the positions on the image display panels corresponding to the minute light-transmissive portions that have become light transmissive. Also, e.g., in patent literature 2, a three-dimensional stereoscopic image display device is suggested which includes a plurality of image reproduction panels, an image display panel, and a display control panel disposed in front of the image display panel and provided with a plurality of groups of minute light-transmissive portions. In this device, the image reproduction panels each display a large number of small images that each are to become a base of a stereoscopic image side by side at a same time in a manner of not overlapping, and meanwhile the image reproduction panels each display a plurality of groups of images of an object viewed from positions substantially slightly different from each other, the image display panel time-divisionally sequentially display the groups of images each displayed on the image reproduction panels, the groups of minute light-transmissive portions open and close in synchronization with each small images of the groups of images time-divisionally displayed on the image display panel, and each group of minute light-transmissive portions includes a large number of minute light-transmissive portions each being in a pinhole-like or slit-like shape.

However, in the stereoscopic image display method as set forth in patent literature 1, a large number of small images must be displayed within the afterimage retention time of the eye to form a high-definition stereoscopic image. In other words, the small images displayed on each image display panel must be switched in a short time. Nevertheless, the image display switching speed of the image display panels has a limitation. To cope with this, a group of the image display panels having a plurality of the image display panels is disposed behind the display control panel, and from the image display panels each displaying the small images in advance, one of the image display panel that displays the small images corresponding to the minute light-transmissive portions of the display control panel is selected. Whereas, in the three-dimensional stereoscopic image display device as set forth in patent literature 2, a plurality of the image reproduction panels each displaying the groups of images are disposed on the back side of the image display panel and on a same plane, a magnifying lens and a flash lamp are provided respectively in front of and behind each image reproduction panel, and the groups of images of the selected image reproduction panel are sequentially projected on the image display panel.

Thus, the following problems arise. For the stereoscopic image display device as set forth in patent literature 1, the structure is complicated and the back side of the display control panel grows in size. For the three-dimensional stereoscopic image display device as set forth in patent literature 2, the back side of the image display panel grows in size and the total disposing area of the image reproduction panels (i.e. the total dimensions of the heights and widths of a plurality of the image reproduction panels) enlarges. Therefore, there is a problem that spatial and temporal constraints occur with regard to using (utilizing) the devices.

In contrast, patent literature 3 suggests a stereoscopic image display device including a display on which a plurality of small images are displayed side by side and each small image has three-dimensional displaying data, first mechanical shutters disposed in front of the display so as to be located in positions corresponding to the small images displayed on the display, and second mechanical shutters disposed in front of the first mechanical shutters so as to be located in positions corresponding to the small images displayed on the display. In this device, the display outputs light rays converted from the three-dimensional data of each small image, the first mechanical shutters time-divisionally extract the light rays as partial light rays output from a plurality of partial regions provided for each small image and make the partial light rays pass forward, and the second mechanical shutters make the partial light rays time-divisionally extracted per each small image pass forward, and make them reconstruct as the light rays and converge in front, thereby forming a three-dimensional image.

In the case of patent literature 3, switching the small images at a high speed is not required because the light rays output from the small images can be time-divisionally extracted at a high speed as the partial light rays output from each of the partial regions by using the first mechanical shutters. Accordingly, patent literature 3 can switch the small images within the afterimage retention time of the viewer's eye without being limited by the display responding speed (switching speed) of the display. Besides, patent literature 3 can considerably reduce the dimension in the depth direction of the stereoscopic display device comparing to patent literatures 1 and 2.

CITATION LIST

Patent Literature

Patent Literature 1: Japanese Unexamined Patent Application Publication No. H9-33858
Patent Literature 2: Japanese Unexamined Patent Application Publication No. 2003-50375
Patent Literature 3: International Publication No. WO 2018/003555

SUMMARY OF INVENTION

Technical Problem

However, in patent literature 3, as shown in FIGS. 2 and 3 of the publication (hereinafter, referred to as "conventional FIGS. 2 and 3"), the small images on the display are displayed while being spaced. Thus, there are problems that the display cannot be effectively utilized, and if the number of the small images increases, the wasted spaces also increase and the area of the display consequently grows in size. Also, there is a problem that the density of the light rays is deteriorated because the small images have the spaces between themselves.

Further, as shown in conventional FIGS. 2 and 3, a plurality of the partial regions provided for each small image are time-divisionally selected by the first mechanical shutters, and the second mechanical shutters for making the partial light rays time-divisionally extracted per each small image pass forward are disposed only one on a light axis passing through the central area of each small image. That is, the position of each second mechanical shutter remains fixed even when the position of the selected one of the partial regions in each small image changes. So, in either case of when each small image is composed of, e.g., four of the partial regions as shown in conventional FIG. 2, or when the number of the partial regions composing each small image grows to be, e.g., 16 as shown in conventional FIG. 3, the second mechanical shutters are each disposed on a light axis passing through the central position of each small image. For this reason, as the number of the partial regions forming each small image increases, the outer edge of each small image (i.e. each partial region located around peripheral portion of each small image) falls into a state where being viewed from a more oblique angle to the display, thereby the formed image becomes distorted or blurred.

Furthermore, since only one of the second mechanical shutters, which opens and closes, is provided only at the central area of each small image, the image to be formed looks somewhat dark. Although the brightness of the display needs to be increased in such a case, the brightness of the display has a limit.

The present invention has been made in consideration of the above circumstances, and has as its object to provide a stereoscopic image display device and a stereoscopic image display method that enable a clear high-resolution stereoscopic image to be viewed with a similar feeling to everyday life without any use of special glasses.

Solution to Problem

In order to achieve the above object, a stereoscopic image display device according to a first aspect of the present invention includes:

a display divided into a plurality of sections, each of the sections including a plurality of small images displayed, each of the small images having a plurality of preset minute images;

a shutter panel disposed in front of the display, the shutter panel including a plurality of first mechanical shutters arranged side by side in units of the minute image, the first mechanical shutters time-divisionally dividing each of the sections per each of the small images by switching on and off in units of the minute image; and an image forming panel including a plurality of image forming means arranged side by side, the image forming means forming an image from light rays from each of the small images, the light rays from each of the small images passing through the first mechanical shutters when the first mechanical shutters are on, wherein each of the small images forms a part of a stereoscopic image to be displayed, one of the image forming means is provided for each of the small images, each of the small images is composed of a plurality of the minute images arranged in a dispersion state, and each of the image forming means is on an axis passing through a central area of a corresponding one of the small images.

In the stereoscopic image display device according to the first aspect of the present invention, each of the minute images may be composed of one of pixels of the display.

In the stereoscopic image display device according to the first aspect of the present invention, each of the minute images may be composed of an assemblage of the pixels of the display.

In the stereoscopic image display device according to the first aspect of the present invention, it is preferred that the on and off of the first mechanical shutters corresponding to each other among the sections be synchronized.

In the stereoscopic image display device according to the first aspect of the present invention, it is preferred that each of the image forming means be a second mechanical shutter switching a minute opening portion on and off.

In order to achieve the above object, a stereoscopic image display method according to a second aspect of the present invention includes:

dividing a display into a plurality of sections;

displaying a plurality of small images in each of the sections, the small images each having a plurality of preset minute images;

time-divisionally dividing each of the sections per each of the small images by switching a plurality of first mechanical shutters on and off in units of the minute image, the first mechanical shutters arranged on a shutter panel disposed in front of the display, the first mechanical shutters arranged in units of the minute image; and forming an image from light rays from each of the small images by using a plurality of image forming means arranged side by side on an image forming panel, the light rays from each of the small images passing through the first mechanical shutters when the first mechanical shutters are on, wherein each of the small images forms a part of a stereoscopic image to be displayed, one of the image forming means is provided for each of the small images, each of the small images is composed of a plurality of the minute images arranged in a dispersion state, and each of the image forming means is on an axis passing through a central area of a corresponding one of the small images.

In the stereoscopic image display method according to the second aspect of the present invention, each of the minute images may be composed of one of pixels of the display.

In the stereoscopic image display method according to the second aspect of the present invention, each of the minute images may be composed of an assemblage of the pixels of the display.

In the stereoscopic image display method according to the second aspect of the present invention, it is preferred that the on and off of the first mechanical shutters corresponding to each other among the sections be synchronized.

In the stereoscopic image display method according to the second aspect of the present invention, it is preferred that each of the image forming means be a second mechanical shutter switching a minute opening portion on and off.

Advantageous Effects of Invention

In the stereoscopic image display device according to the first aspect of the present invention and the stereoscopic image display method according to the second aspect of the present invention, the screen of the one display is divided into a plurality of the sections, a plurality of the small images are displayed in each section, and further, each small image is composed of a plurality of the minute images arranged in a dispersion state. This enables the stereoscopic image display device to be more compact (i.e. the displaying area can be shrunk), and also makes it possible to increase the density of the light rays forming a three-dimensional image (including a two-dimensional image) by densely arranging the small images, thereby displaying a clear high-resolution three-dimensional image. Furthermore, by switching the first mechanical shutters on and off (i.e. by opening and closing the first mechanical shutters) in units of the minute image and time-divisionally dividing each section per each small image, one of the small images can be sequentially selected at a high speed from a plurality of the small images preset (pre-displayed) in each section, without being limited by the responding speed for displaying (i.e. the switching speed) of the display, and the light rays output from each small image can be time-divisionally extracted. This makes it possible to provide a clear three-dimensional image and to smoothly replay a moving image. Moreover, one of the image forming means for forming an image from the light rays from each small image is provided for each small image, and each image forming means is disposed on an axis passing through the central area of a corresponding one of the small images. Thus, the light rays from each small image are extracted always from the central area of a corresponding one of the small images although the small images are time-divisionally sequentially selected and the displaying range (position) in each section changes at each time. Therefore, a bright three-dimensional image with little distortion can be obtained.

In the stereoscopic image display device according to the first aspect of the present invention and the stereoscopic image display method according to the second aspect of the present invention, when each minute image is composed of one of the pixels of the display, a plurality of the small images can be densely arranged, thereby a bright high-definition three-dimensional image without distortion can be obtained.

In the stereoscopic image display device according to the first aspect of the present invention and the stereoscopic image display method according to the second aspect of the present invention, when each minute image is composed of an assemblage of the pixels of the display, the pitch of the first mechanical shutters can be wider than the pitch of the pixels since it is enough that the first mechanical shutters switching on and off in units of the minute image are provided one by one for each minute image (i.e. for each assemblage of the pixels). Although this deteriorates the resolution of the three-dimensional image, the manufacturing of the first mechanical shutters becomes easier and the mass-productivity improves.

In the stereoscopic image display device according to the first aspect of the present invention and the stereoscopic image display method according to the second aspect of the present invention, when the on and off of the first mechanical shutters corresponding to each other among the sections are synchronized, the small images never switch at various timings depending on the section. This shortens the total time needed for the small image selection (switching), thereby surely extracting the light rays output from all the small images within the afterimage retention time of the viewer's eye, and thus a clear three-dimensional image can be displayed.

In the stereoscopic image display device according to the first aspect of the present invention and the stereoscopic image display method according to the second aspect of the present invention, when each image forming means is the second mechanical shutter switching the minute opening portion on and off, a clear real image of a three-dimensional image can be obtained by switching the minute opening portions on and off (i.e. by opening and closing the minute opening portions) at a high speed and time-divisionally extracting the light rays output from each small image.

DESCRIPTION OF EMBODIMENTS

An embodiment of the present invention will be described next with reference to the accompanying drawings to provide an understanding of the present invention.

A stereoscopic image display device 10 according to the embodiment of the present invention shown in FIGS. 1 to 6(D) forms a three-dimensional image (stereoscopic image) by converging light rays output from a plurality of small images 12a to 12d displayed on a display 11.

Figure 2:
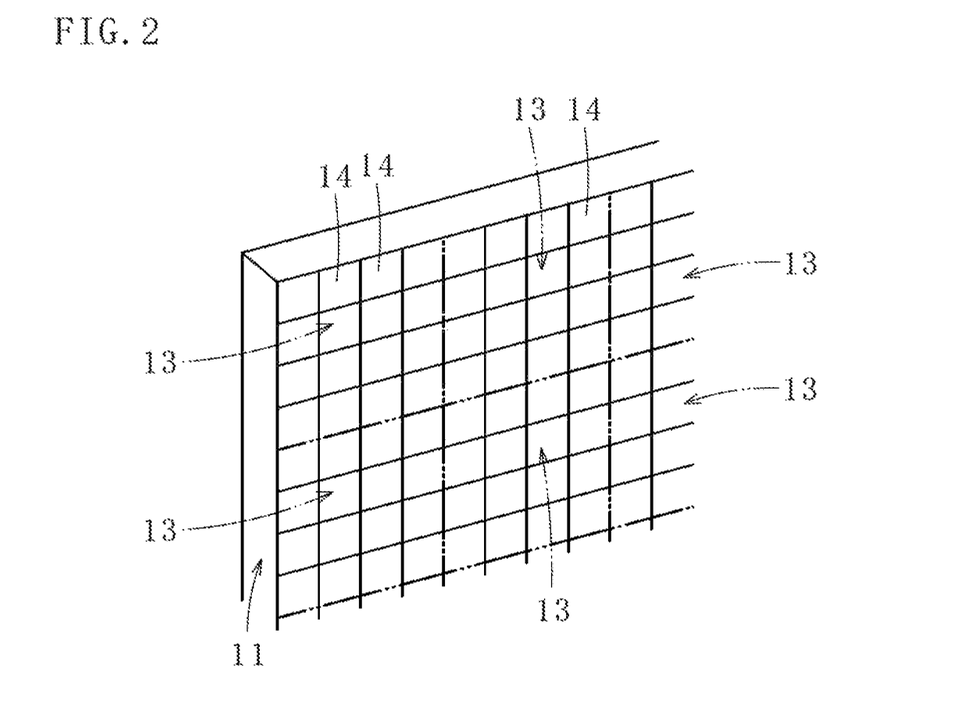
FIG. 2 is an oblique perspective figure for illustrating the display of the same stereoscopic image display device.
Figure 4A:
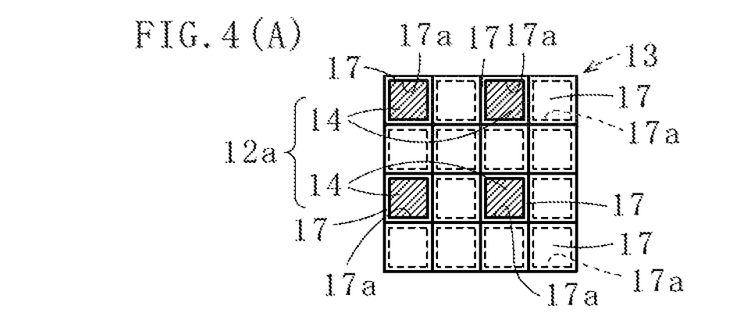
FIGS. 4(A) to 4(D) are explanatory figures for illustrating the behavior of the first mechanical shutters of the same stereoscopic image display device.
Figure 4B:
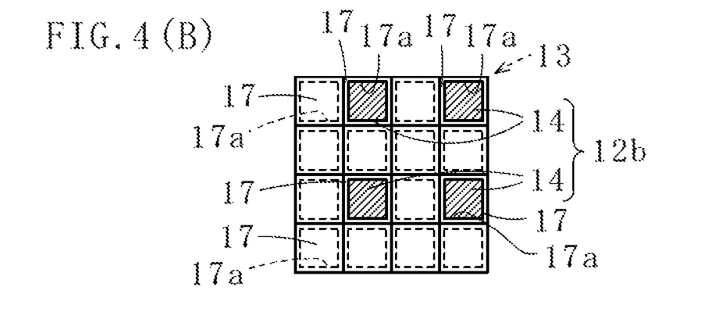
Figure 4C:
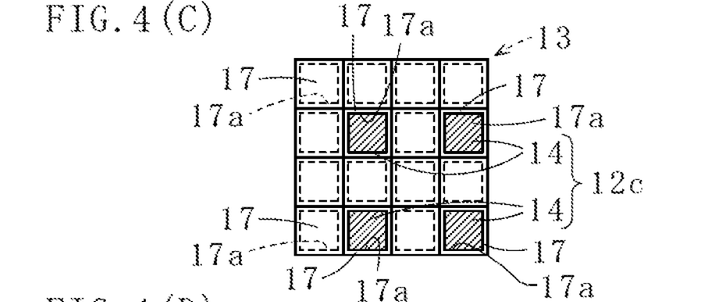
Figure 4D:
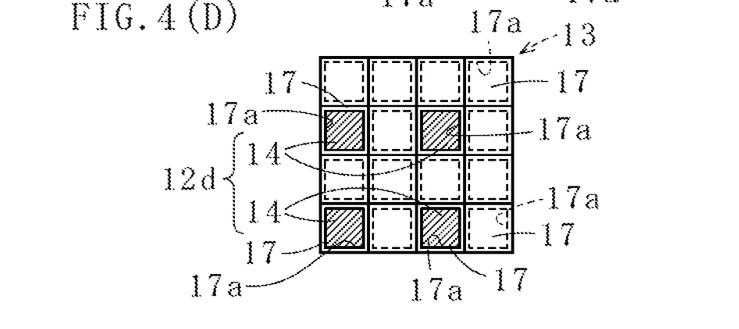
Figure 5:
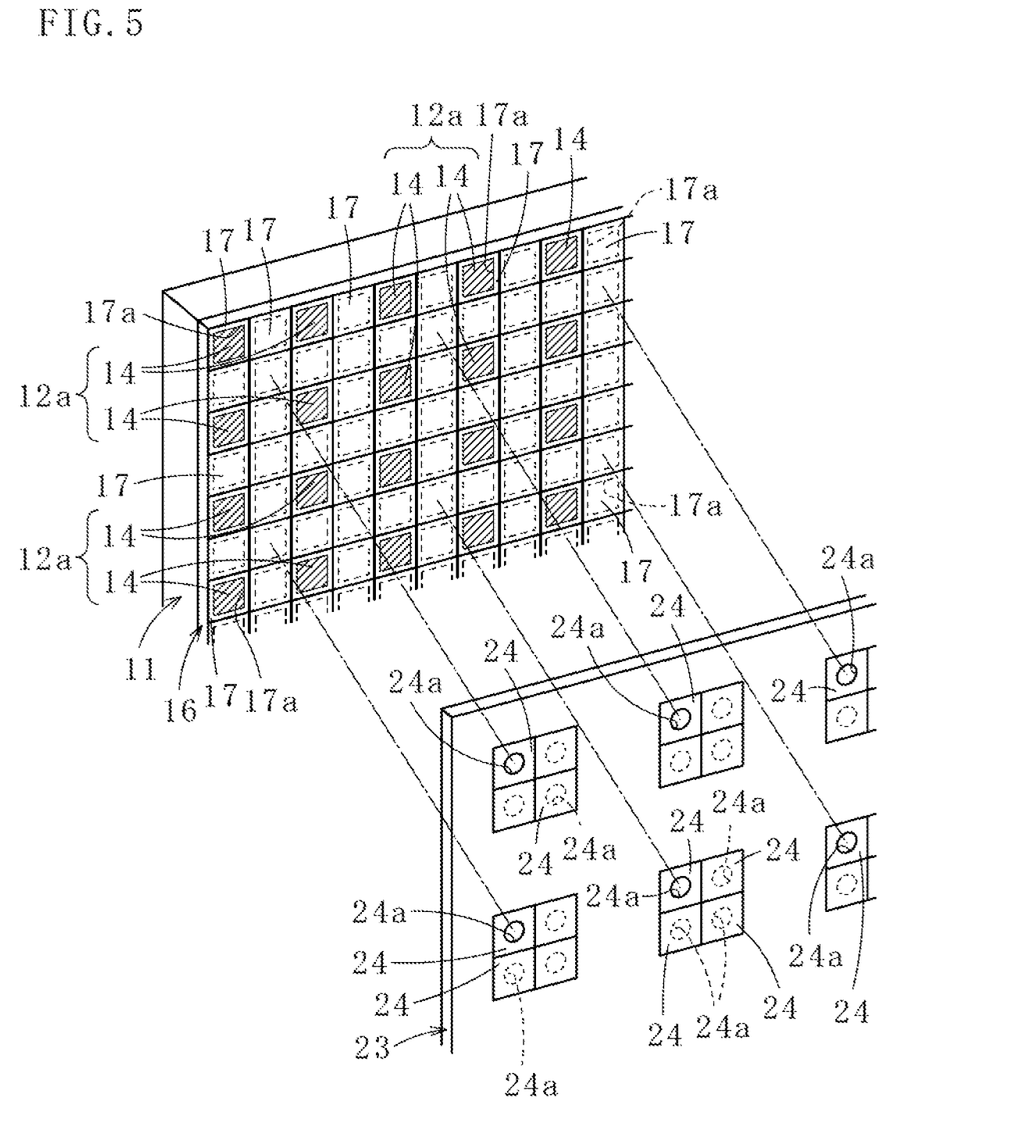
FIG. 5 is an oblique perspective figure for illustrating the behavior of the first and second mechanical shutters of the same stereoscopic image display device.

As shown in FIG. 2, the displaying surface of the display 11 is divided into a plurality of sections 13. Although each section 13 is an area that includes four pixels in height by four pixels in width in this embodiment, the number of the pixels composing each section can be selected as appropriate. Note that each section 13 here represents a displaying area on the display 11 and it does not mean that the display 11 is physically divided. In each section 13, as shown in FIGS. 4(A) to 5, the small images 12a to 12d each including a plurality (four, in this embodiment) of preset minute images 14 are displayed. The minute images 14 are arranged in a dispersion state with respect to each of the small images 12a to 12d. That is, the minute images 14 are arranged in a manner where a set of the four minute images 14 forming one of the small images 12a to 12d does not overlap on any one of the other sets of the four minute images 14 forming the other ones of the small images 12a to 12d, while the displaying areas (each of which is an area of three pixels in height by three pixels in width in this embodiment) of the small images 12a to 12d are partially overlapped on each other. Here, each minute image 14 is composed of one of the pixels of the display 11 (FIG. 2).

Figure 1:
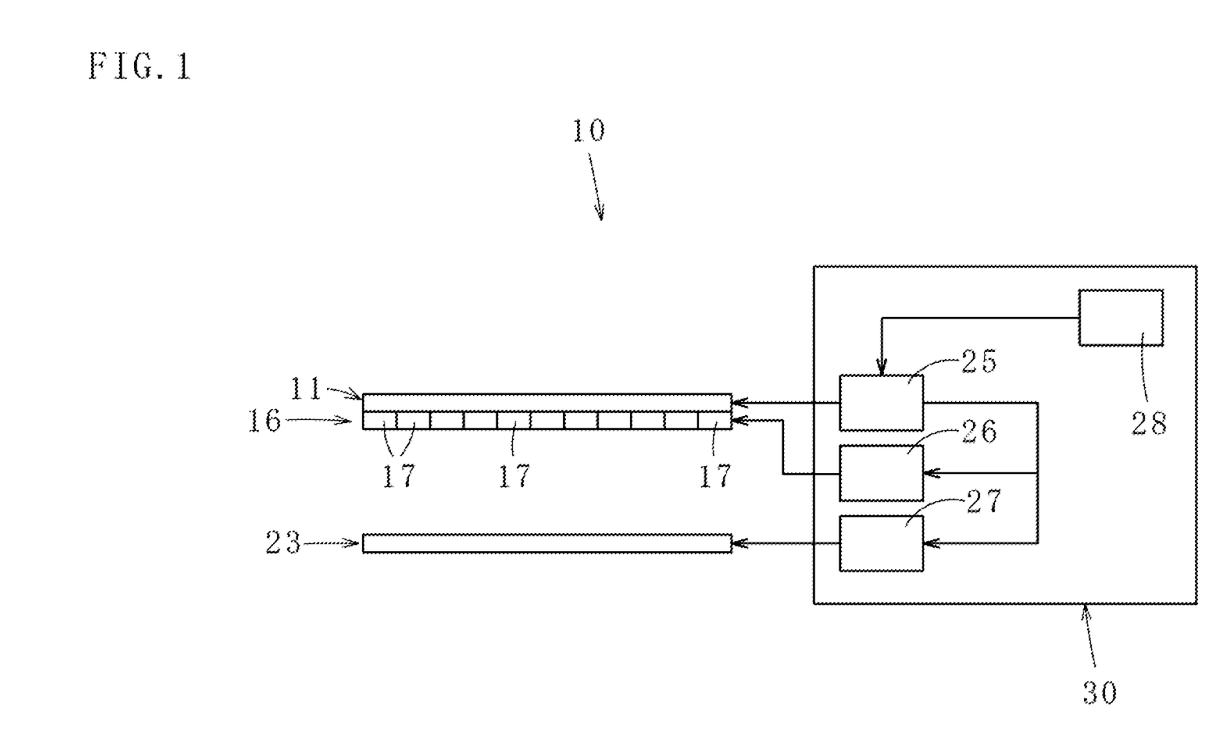
FIG. 1 is a block diagram of a stereoscopic image display device according to an embodiment of the present invention.
Figure 3:
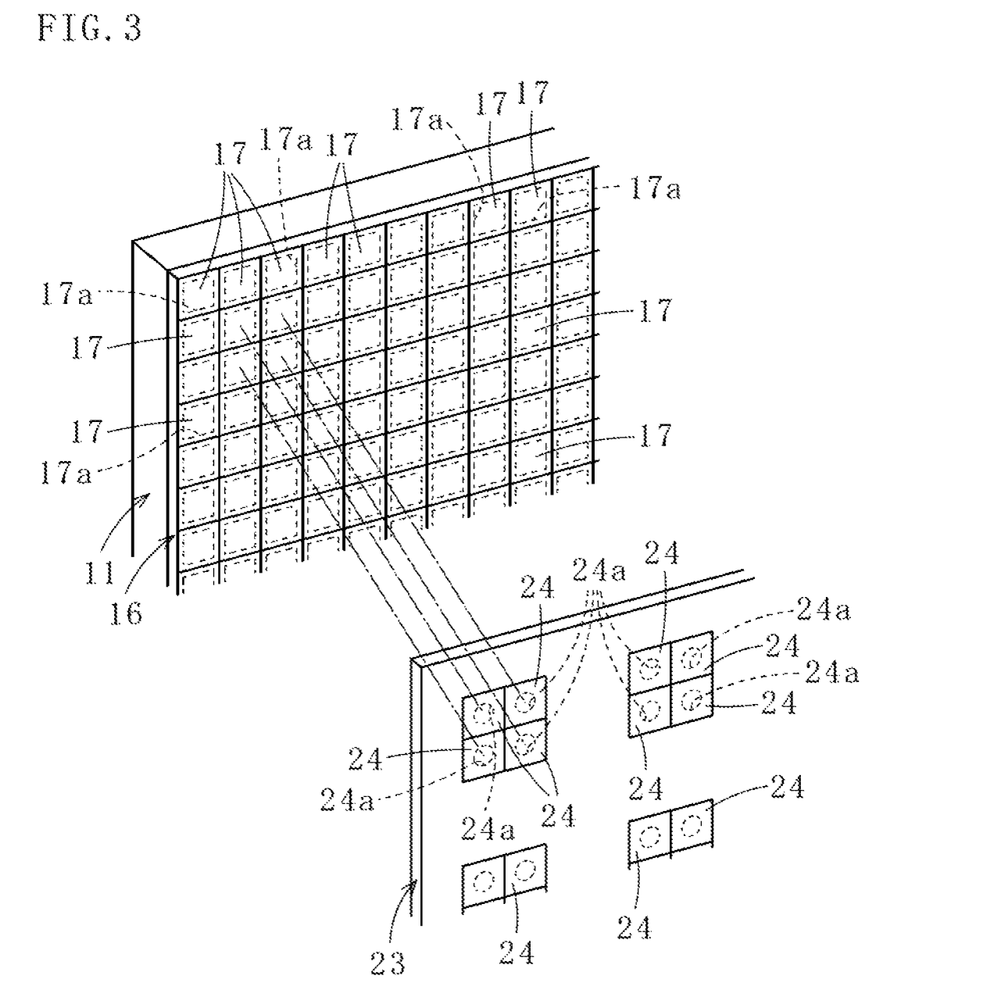
FIG. 3 is an oblique perspective figure for illustrating the display, the shutter panel, and the image forming panel of the same stereoscopic image display device.

The stereoscopic image display device 10 has a shutter panel 16 disposed in front of the display 11 as shown in FIGS. 1, 3, and 5. Although it is preferred that the shutter panel be in immediate contact with the display, the shutter panel may be integrated with the display or be formed separately (independently) from the display. On the shutter panel 16, a plurality of first mechanical shutters 17 arranged side by side so as to accord with the pixel arrangement of the display 11 (i.e. arranged side by side in units of the minute image 14) are provided as shown in FIGS. 3 to 6(D). Each first mechanical shutter 17 is preferably formed to have a size that is the same as the pixel of the display 11. It is also preferred that each first mechanical shutter 17 switch on and off (i.e. open and close) a minute opening portion 17a that has a size that is the same as the pixel by an opening and closing means (not shown in the figures).

Figure 6A:
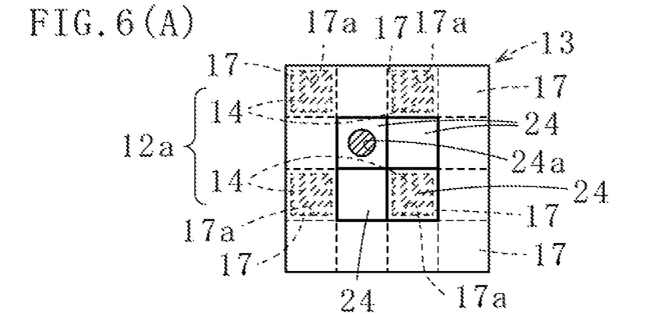
FIGS. 6(A) to 6(D) are explanatory figures for illustrating the behavior of the first and second mechanical shutters of the same stereoscopic image display device.
Figure 6B:
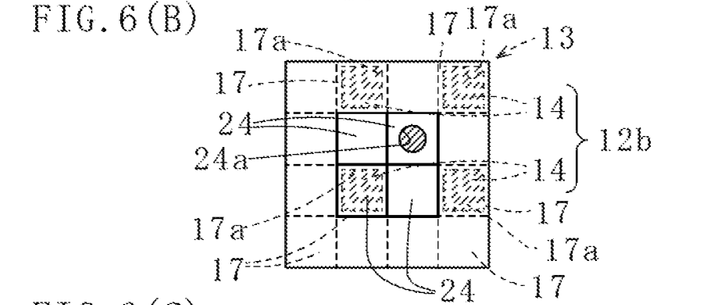
Figure 6C:
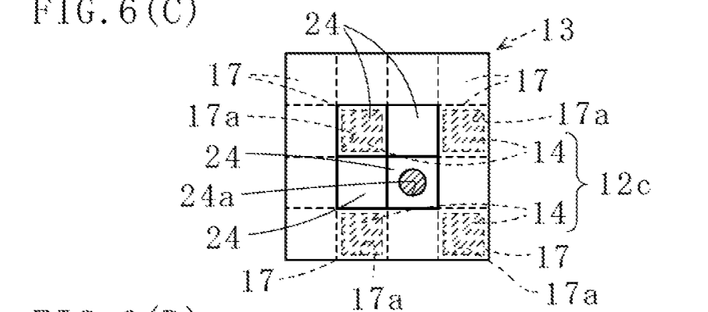
Figure 6D:
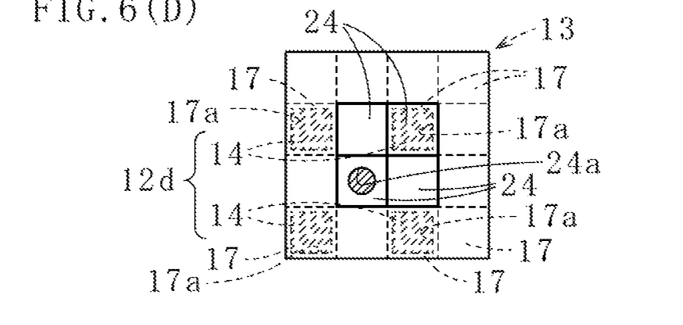

More specifically explaining, the first mechanical shutters 17 time-divisionally divide each section 13 per each of the small images 12a to 12d (e.g. in the order of FIGS. 4(A), 4(B), 4(C), and 4(D)) by switching on and off in units of the minute image 14 as shown in FIGS. 4(A) to 4(D). By this, each of the small images 12a to 12d is sequentially selected and light rays output from each of the small images 12a to 12d (i.e. the hatched areas) are time-divisionally extracted and made to pass forward. Illustrated by FIG. 5 is a state where the small image 12a shown in FIG. 4(A) is selected in each section 13 by switching on the first mechanical shutters 17 that correspond to the four minute images 14 composing the small image 12a (whereas the other first mechanical shutters are off). As long as the on and off of the first mechanical shutters 17 corresponding to each other among the sections 13 are synchronized like this, the small images 12a to 12d never switch at various timings depending on the section 13. Also, the first mechanical shutters 17 for sequentially selecting the small images 12a to 12d switch on and off (i.e. open and close) in units of the minute images 14 composing each of the small images 12a to 12d. By this, when the small image 12a is selected in each section 13 as shown in FIGS. 5 and 6(A), only the light rays output from the selected small image 12a are surely extracted by blocking the light rays output from the unselected small images 12b to 12d. As a result, the light rays extracted by the first mechanical shutters 17 never include any noises, and the color tone change of the light rays is prevented.

The stereoscopic image display device 10 has an image forming panel 23 in front of the display 11 (the shutter panel 16) disposed with a predetermined distance therebetween as shown in FIGS. 1, 2, and 5. On the image forming panel 23, second mechanical shutters 24, each of which switches a minute opening portion 24a on and off (i.e. opens and closes the minute opening portion 24a) using an opening and closing means (not shown in the figures), are arranged side by side as the image forming means, which are for forming an image from the light rays from each of the small image 12a to 12d that pass through the first mechanical shutters 17 when the first mechanical shutters are on, as shown in FIGS. 3 and 5 to 6(D). As shown in FIGS. 6(A) to 6(D), at each on-time of the first mechanical shutters 17 that sequentially select one of the small images 12a to 12d per each section 13, the second mechanical shutters (image forming means) 24 (i.e. the hatched areas with solid lines) corresponding to the sequentially selected one of the small images 12a to 12d become on-time and open their minute opening portions 24a, and the light rays, which are output from the small images 12a to 12d and time-divisionally extracted in each section 13, pass forward and converge (i.e. form an image) and thereby forming a three-dimensional image. As the second mechanical shutters 24 are each on an axis passing through a central area of a corresponding one of the small images 12a to 12d as shown in FIGS. 6(A) to 6(D), the light rays from the small images 12a to 12d are extracted from the central area of each of the small images 12a to 12d, even though the small images 12a to 12d are time-divisionally sequentially selected and the displaying area (position) in each section 13 changes at each time. This makes it possible to provide a bright high-definition three-dimensional image without distortion. Thus, the image forming panel 23 is only required to have the second mechanical shutters 24 arranged side by side at least one for each of the small images 12a to 12d as shown in FIGS. 3 and 5 to 6(D). However, in a case of using an image forming panel having the second mechanical shutters arranged side by side so as to accord with the pixel arrangement of the display, it can deal with changes of the number and arrangement of the minute images composing each small image and changes of the displaying positions of the small images, thereby becoming more superior in versatility.

As shown in FIG. 1, the stereoscopic image display device 10 includes a control unit 30 provided with a display image operation means 25, a first mechanical shutter operation means 26, a second mechanical shutter operation means 27, and a small image making means 28. The display image operation means 25 is for displaying the small images 12a to 12d on the display 11, the first mechanical shutter operation means 26 is for selecting the first mechanical shutters 17 so as to accord with the positions of the minute images 14 composing each of the small images 12a to 12d displayed on the display 11 and switching the first mechanical shutters 17 on and off (i.e. opening and closing the minute opening portions 17a), the second mechanical shutter operation means 27 is for switching the second mechanical shutters 24 to be on-time when the first mechanical shutters 17 are on-time, so as to accord with the central area of each of the small images 12a to 12d displayed on the display 11, and the small image making means 28 is for making the small images 12a to 12d. A detailed explanation will be provided below.

With regard to the number of pixels of the display 11, it is preferred to be, e.g., 4,000 pixels or more in the width (horizontal) direction and 2,000 pixels or more in the height (vertical) direction (i.e. equal to or more than 4K, more preferably, a display having the number of pixels of 8K or more). This enables a large number of the small images 12a to 12d with a high definition to be displayed side by side on the one display 11, thereby forming a high-resolution three-dimensional image.

As the first mechanical shutters 17 and the second mechanical shutters 24, MEMS (Micro Electro Mechanical Systems) shutter elements each having a machinery structure and each being electrically drivable are preferably used. This enables the first mechanical shutters 17 and the second mechanical shutters 24 each having a size that is the same as the pixel of the display 11 to be arranged side by side so as to accord with the pixel arrangement of the display 11 (i.e. to be arranged with a density that is the same as the pixel density of the display 11) as mentioned above. As a result, it is possible to select the first mechanical shutters 17 corresponding to the positions of the minute images (pixels) 14 composing each of the small images 12a to 12d and make them function. Also, regarding the image forming panel 23, it is possible to select one of the second mechanical shutters 24 being on an axis passing through the central area of each of the small images 12a to 12d, and make it function. Additionally, it becomes to be able to extract the light rays output from all the small images 12a to 12d in each section within the afterimage retention time of the eye (e.g. 1/60 to 1/30 seconds). Incidentally, the distance between the display 11 and the image forming panel 23 is preferred to be decided such that the light rays output from each of the small images 12a to 12d can pass forward to the front side of the image forming panel 23 through the second mechanical shutters 24 in an even manner.

In this embodiment a case has been explained where each of the small images 12a to 12d is composed of four of the minute images (pixels) 14 (while the displaying area of each small image is composed of nine of the pixels), each section 13 is composed of 16 of the pixels, and the four minute images 14 composing each of the small images 12a to 12d are arranged in a dispersion state. However, the number and the arranging way of the minute images composing each small image, the number of the pixels composing each minute image, the number of the pixels composing each section, the shape of each section, and the number and the arranging way of the small images displayed in each section are not limited by the above embodiment, but can be selected as appropriate.

Further, although each second mechanical shutter 24 corresponds to one of the small images 12a to 12d in this embodiment, a plurality of the second mechanical shutters that are on an axis passing through the central area of (the displaying area of) each small image may correspond to each of the small images 12a to 12d depending on the number, size, or arranging way of the minute images composing each small image.

In FIGS. 3 and 5 to 6(D), the minute opening portions 24a that switch on and off (i.e. open and close) provided one for each second mechanical shutter 24 are each illustrated as being in a circular shape when viewed from above. However, the shape of each minute opening portion is not limited to this but may be a square shape, a rectangular shape, or a polygonal shape such as a hexagonal shape and an octagonal shape. Incidentally, since each minute opening portion is in a minute pinhole-like state having a size that is the same as the pixel of the display 11 regardless of the shape, the light rays having passed through the second mechanical shutters (minute opening portions) form an image, thereby a three-dimensional real image can be viewed. However, each minute opening portion may be in a slit-like state.

The display image operation means 25 of the control unit 30 is configured by installing to a computer a program including a small image display function that reads data needed for the three-dimensional displaying, converts the data into displaying signals of the small images 12a to 12d, and displays the small images 12a to 12d on the display 11 using the signals. Instead of installing the program to the computer, a dedicated circuit for converting the data needed for the three-dimensional displaying into the displaying signals of the small images 12a to 12d may be connected to the signal input side of the display 11. In this case, using the dedicated circuit enhances the displaying speed of the small images 12a to 12d.

The first mechanical shutter operation means 26 of the control unit 30 is configured by installing to the computer a program including a first shutter operation function that obtains from the display image operation means 25 the positional information of the pixels used for displaying each of the small images 12a to 12d, and inputs driving signals that time-divisionally switch on a plurality of the first mechanical shutters 17 located at positions corresponding to a plurality of the minute images 14 composing each of the small images 12a to 12d (refer to FIGS. 4(A) to 4(D)) while switching off all the rest of the first mechanical shutters 17. Note that the on and off of the first mechanical shutters 17 corresponding to each other among the sections 13 are synchronized. That is, the time-divisional driving of the first mechanical shutters 17 illustrated in FIGS. 4(A) to 4(D) is simultaneously performed (in synchronization with each other) in all the sections 13.

The second mechanical shutter operation means 27 of the control unit 30 is configured by installing to the computer a program including a second shutter operation function that obtains from the display image operation means 25 the positional information of the pixels used for displaying each of the small images 12a to 12d, and with regard to the image forming panel 23, switches one (or a plurality) of the second mechanical shutters 24 being on an axis passing through the central area of (the displaying area of) each of the small images 12a to 12d to on-time in synchronization with the on-time of the first mechanical shutters 17.

The small image making means 28 of the control unit 30 can be configured by installing to the computer a computer graphics function. This computer graphics function makes images of a three-dimensional object by e.g. moving a virtual camera in a three-dimensional space, and obtains data that is to be a base for displaying the small images needed for the three-dimensional displaying.

Alternatively, the small image making means 28 may be configured by installing to the computer a three-dimensional data obtaining function for obtaining data needed for the three-dimensional displaying. In this case, the needed data may be obtained as explained below.

First, an object to be three-dimensionally displayed is imaged by an imaging means (e.g. a stereo camera) to obtain image data. Then, based on the image data, polygonal shapes composing the surface of the object viewed from each position of the stereo camera are extracted. Finally, coordinate values of the vertexes of the extracted polygonal shapes, information about the connection of the adjacent vertexes of the polygonal shapes, and information about the color of each polygonal shape are computed.

Subsequently, a stereoscopic image display method where the stereoscopic image display device 10 according to the embodiment of the present invention is applied will be explained below.

In the stereoscopic image display method, the screen of the display 11 is divided into a plurality of the sections 13 (FIG. 2), and the small images 12a to 12d each having a plurality of the preset minute images 14 are displayed on each section 13 (FIGS. 4(A) to 4(D) and 6(A) to 6(D)). Then, the first mechanical shutters 17 disposed in units of the minute image 14 on the shutter panel 16, which is formed being integrated with or formed separately (independently) from the display 11 and disposed in front of the display 11 so as to be in immediate contact with the display 11, are switched on and off in units of the minute image 14, thereby the minute opening portions 17a are opened and closed, and each section 13 is time-divisionally divided per each of the small images 12a to 12d. Subsequently, by using the second mechanical shutters (image forming means) 24 disposed side by side on the image forming panel 23, an image is formed from the light rays from each of the small images 12a to 12d passing through when the first mechanical shutters 17 are on, thereby a stereoscopic image is displayed. The small images 12a to 12d each form a part of the stereoscopic image to be displayed and one of the second mechanical shutters 24 is provided for each of the small images 12a to 12d. Each of the small images 12a to 12d is composed by a plurality of the minute images 14 arranged in a dispersion state, and each second mechanical shutter 24 is on an axis passing through the central area of a corresponding one of the small images 12a to 12d.

In other words, by time-divisionally switching the first mechanical shutters 17 on and off such that one of the small images 12a to 12d is sequentially selected in each section 13, the light rays output from each of the small images 12a to 12d are time-divisionally extracted and made to pass forward (FIGS. 4(A) to 4(D)). Then, one (or a plurality) of the second mechanical shutters 24, which is (are) disposed in front of the display 11 (shutter panel 16) with a predetermined distance therebetween and located at the central area of each of the small images 12a to 12d, is (are) switched to be on-time when the first mechanical shutters 17 for sequentially selecting one of the small images 12a to 12d per each section 13 are on-time (FIGS. 6(A) to 6(D)), thereby the minute opening portions 24a open, and a three-dimensional real image is formed by making the light rays, which are output from each of the small images 12a to 12d and time-divisionally extracted per each section 13, pass forward and converge.

The first mechanical shutters 17 each having a size that is the same as the pixel of the display 11 are arranged so as to accord with the pixel arrangement of the display 11, and each of the small images 12a to 12d is sequentially selected by switching on and off (i.e. by opening and closing) a plurality of the first mechanical shutters 17 corresponding to the positions of the minute images (pixels) 14 composing each of the small images 12a to 12d (i.e. by switching the first mechanical shutters 17 on and off in units of the minute image 14). Accordingly, when the small image 12a is being selected in each section 13 as shown in FIGS. 5 and 6(A), only the light rays output from the selected small image 12a are surely extracted by blocking the light rays output from the unselected small images 12b to 12d. As a result, the light rays extracted by the first mechanical shutters 17 do not include any noise, and thus color tone changes of the light rays having passed through the second mechanical shutters 24 are prevented and attenuation of the light amount is reduced, thereby a bright high-definition three-dimensional image without distortion can be obtained.

When time-divisionally extracting the light rays output from each of the small images 12a to 12d disposed in each section 13, the opening-closing speed of the first mechanical shutters 17 is set such that the light rays output from all the small images 12a to 12d in each section 13 can be extracted within the afterimage retention time of the eye. Here, since it is required only that the light rays output from all the small images 12a to 12d are extracted within the afterimage retention time of the eye in order to view a three-dimensional image, the on and off of the first mechanical shutters 17 located at positions corresponding to each other among the sections 13 do not necessarily need to be synchronized. However, if the on and off of the first mechanical shutters 17 located at positions corresponding to each other among the sections 13 are synchronized, the small images 12a to 12d never switch at various timings depending on the section 13, and thus, the total time required for selecting (switching) a plurality of the small images 12a to 12d is shortened and the light rays output from all the small images 12a to 12d are surely extracted within the afterimage retention time of the viewer's eye, thereby displaying a clear three-dimensional image. Also, synchronizing the off-time of the second mechanical shutters 24 with the off-time of the first mechanical shutters 17 per each dividing pattern of the time-division of the first mechanical shutters 17 in addition to synchronizing the on-time of the second mechanical shutters 24 with the on-time of the first mechanical shutters 17, provides a clear three-dimensional image with no noise since no excess light ray passes through the second mechanical shutters 24 when time-divisionally driving the first mechanical shutters 17 (i.e. when switching the selection of the small images 12a to 12d).

The light rays having passed through each second mechanical shutter 24 diffuse after converging in front of the image forming panel 23. By viewing these diffusing light rays from the front side of the image forming panel 23, virtual object points from each of which the light rays diffuse (i.e. the light rays are emitted), are seen at the converging position of the light rays. As a result, as an assemblage of the virtual object points, a three-dimensional image (stereoscopic image) can be viewed in front of the image forming panel 23. Since the light rays diffusing from the assemblage of the virtual object points have a quality that is the same as the light rays output from each of the small images 12a to 12d, the three-dimensional image viewed here becomes a bright high-definition one without distortion.

A stereoscopic image display device and a stereoscopic image display method according to a modification of the present invention are subsequently explained. Note that some composing elements that are the same as the stereoscopic image display device 10 are given the same reference signs and omitted from the detailed explanation.

Figure 7:
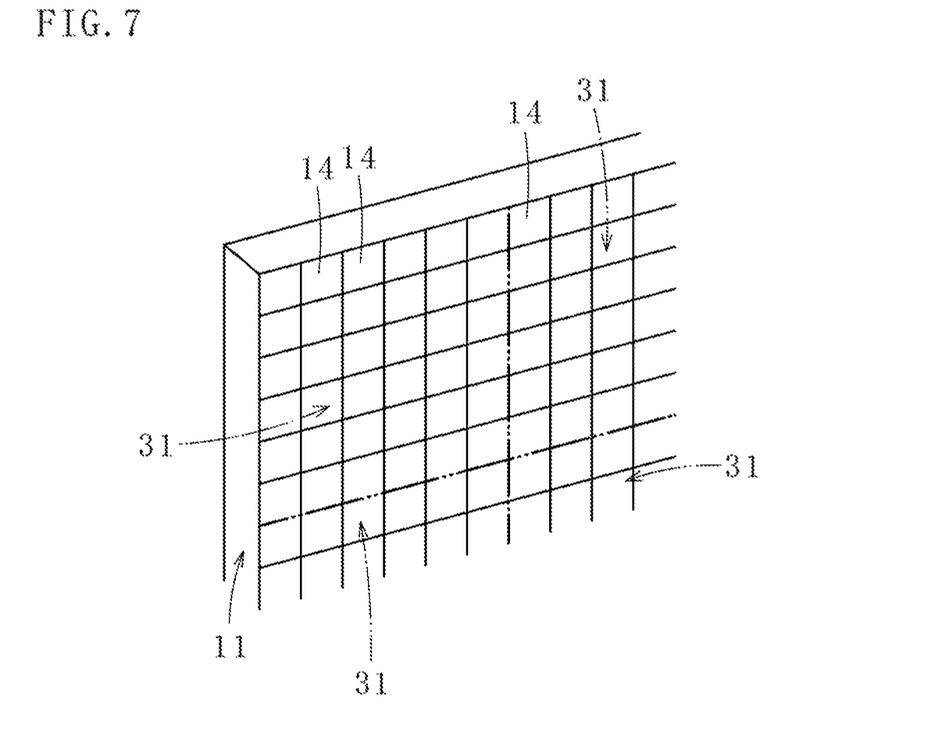
FIG. 7 is an oblique perspective figure for illustrating the display of a stereoscopic image display device according to a modification.

In the stereoscopic image display device according to the modification, the displaying surface of the display 11 is divided into a plurality of sections 31 each having an area of six pixels in height by six pixels in width as shown in FIG. 7. On each section 31, a plurality (four, in this modification) of small images 32a to 32d are displayed as shown in FIG. 9 and each of the small images 32a to 32d includes nine minute images 14 each arranged in a dispersion state. That is, the minute images 14 are arranged in a manner where a set of the nine minute images 14 forming one of the small images 32a to 32d does not overlap on any one of the other sets of the nine minute images 14 forming the other ones of the small images 32a to 32d, while the displaying areas (each of which is an area of five pixels in height by five pixels in width in this modification) of the small images 32a to 32d partially overlap on each other.

Figure 8:
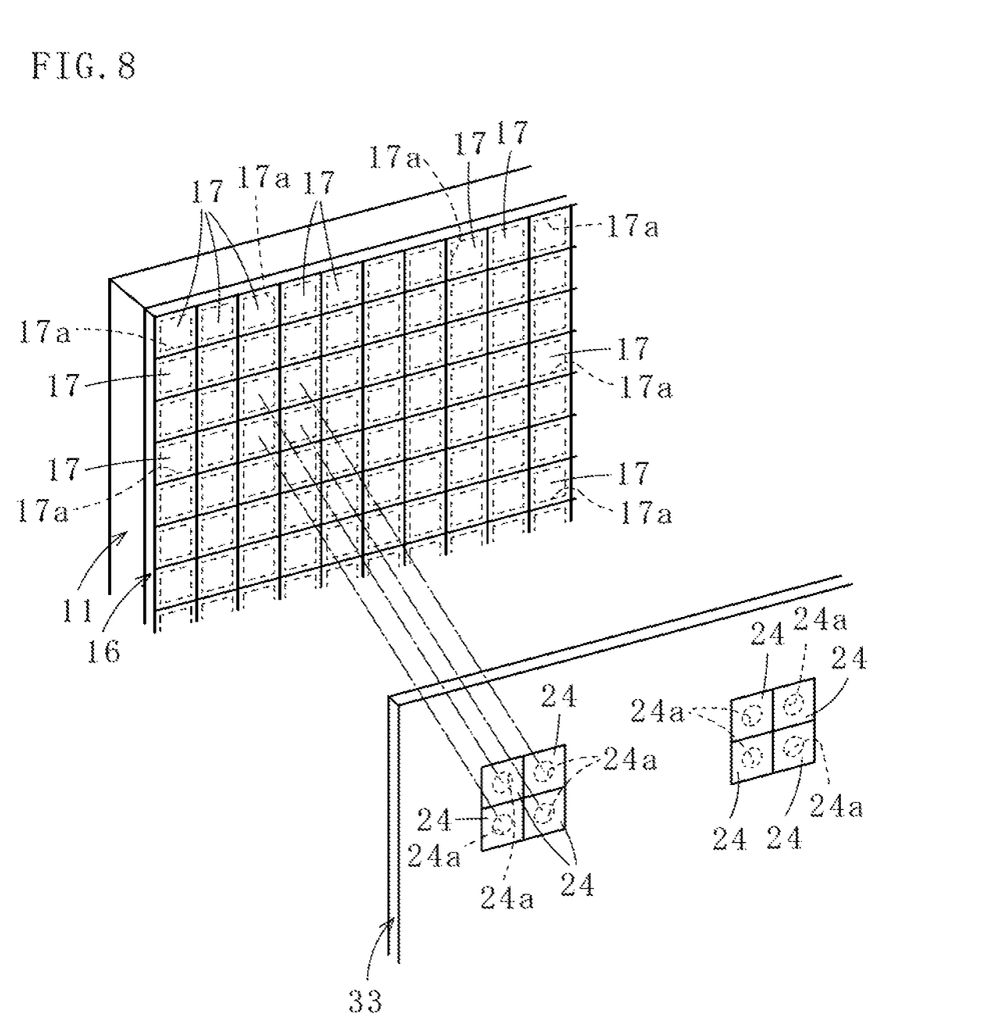
FIG. 8 is an oblique perspective figure for illustrating the display, the shutter panel, and the image forming panel of the same stereoscopic image display device.

As shown in FIGS. 8 and 9, on an image forming panel 33, the second mechanical shutters 24 each disposed on an axis passing through a central area of (the displaying area of) one of the small images 32a to 32d are provided. As shown in FIGS. 9(A) to 9(D), the first mechanical shutters 17 time-divisionally divide each section 31 per each of the small images 32a to 32d (e.g. in an order of FIGS. 9(A), 9(B), 9(C), and 9(D)) by switching on and off (i.e. by opening and closing) in units of the minute image 14. By this, the first mechanical shutters 17 sequentially select each of the small images 32a to 32d, time-divisionally extract the light rays output from each of the small images 32a to 32d (i.e. the hatched areas), and make the extracted light rays pass forward.

Figure 9A:
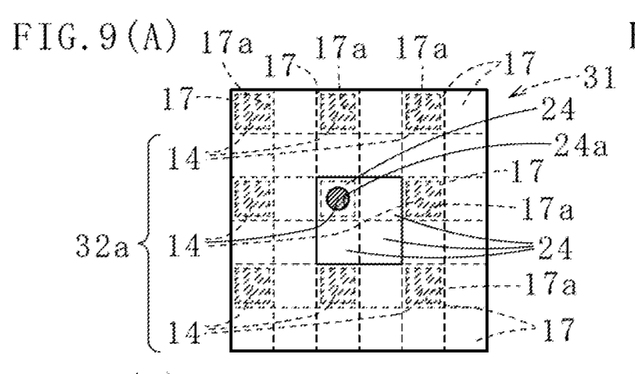
FIGS. 9(A) to 9(D) are explanatory figures for illustrating the behavior of the first and second mechanical shutters of the same stereoscopic image display device.
Figure 9B:
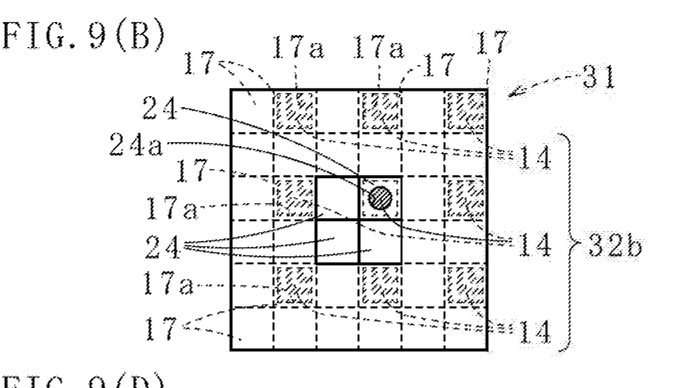
Figure 9C:
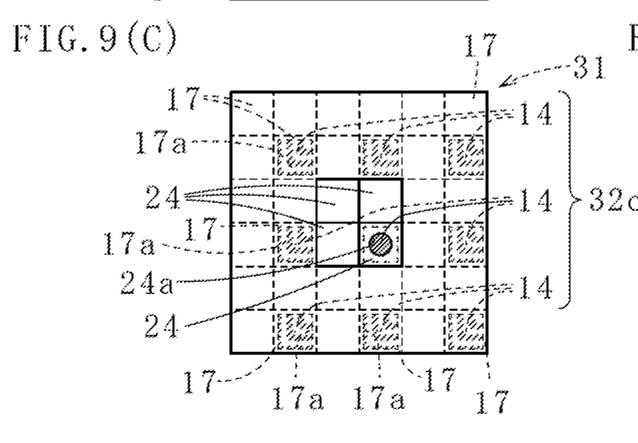
Figure 9D:
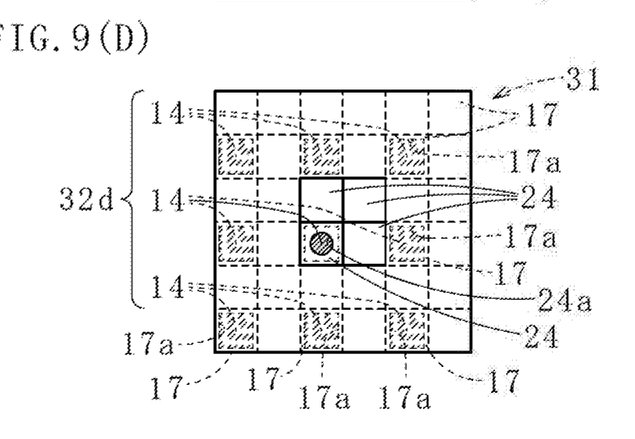

The image forming panel 33 makes the second mechanical shutters 24 function such that (one, in this modification, of) the second mechanical shutters 24 being on an axis passing through the central area of (the displaying area of) each of the small images 32a to 32d correspond(s) to each of the small images 32a to 32d as shown in FIGS. 8 to 9(D). That is, as shown in FIGS. 9(A) to 9(D), each second mechanical shutter 24 (i.e. each hatched area with the solid lines) corresponding to one of the small images 32a to 32d that is being selected by the first mechanical shutters 17 that sequentially select each of the small images 32a to 32d in each section 31, becomes on-time in accordance with the on-time of the first mechanical shutters 17, and its minute opening portion 24a opens. Then the light rays, which are output from each of the small images 32a to 32d and time-divisionally extracted per each section 31, pass forward and converge, thereby forming a three-dimensional image.

By arranging the second mechanical shutters 24 so as each to be on an axis passing through the central area of one of the small images 32a to 32d as described above, the position of the second mechanical shutter 24 to become on-time moves depending on each position of the small images 32a to 32d that are sequentially selected. This enables to evenly extract without deflection the light rays output from a plurality of the minute images 14 composing each of the small images 32a to 32d, from the second mechanical shutters 24 each being on the axis passing through the central area of one of the small images 32a to 32d. So, even if the number of the minute images 14 composing each small image increases and the displaying area enlarges, it is possible to display a clear stereoscopic (three-dimensional) image with no distortion by disposing the second mechanical shutters so as each to be on an axis passing through the central area of one of the small images and making them function so as each to correspond to one of the small images. Particularly, as long as the image forming panel provided with the second mechanical shutters arranged so as to accord with the pixel arrangement of the display (i.e. the image forming panel having a plurality of the second mechanical shutters evenly arranged throughout the length and width of the image forming panel) is prepared in advance, the following conditions can be changed (selected) as appropriate according to the variety (e.g. the required resolution) of the stereoscopic image to be displayed by the stereoscopic image display device: the number and size of the sections on the display; the number, size, and arrangement of the small images to be displayed in each section; and the number, size, and arrangement of the minute images composing each small image.

The present invention has been described above with reference to the embodiment. However, the present invention is not limited to the structures described in the above embodiment, and the present invention includes other embodiments and modifications conceivable within the scope of the matters described in the scope of the claims.

The shutter panel may be disposed in front of the display so as to be adjacent to the display (with a space therebetween) instead of being disposed in front of the display with an immediate contact with the display. Also, although it is described in the above embodiment that the MEMS shutter elements, for example, are used as the first and second mechanical shutters, the first and second mechanical shutters may directly open and close the minute opening portions by an opening and closing means. Alternatively, each minute opening portion may be indirectly opened and closed by opening and closing with the opening and closing means an opening portion larger than the minute opening portion disposed so as to overlap the minute opening portion. Incidentally, as the first and second mechanical shutters, it is also considered to use liquid crystal shutters (in this case, "mechanical shutters" should be accordingly read as "liquid crystal shutters").

Further, although it is described in the above embodiment that each minute image is composed of one of the pixels of the display, there may be a case where each minute image may be composed of an assemblage of the pixels (i.e. a plurality of the pixels) of the display. Such a case deteriorates the resolution, but widens the pitch of the first mechanical shutters disposed so as each to correspond to one of the minute images, thereby having an advantage in manufacturing.

In a case where each small image is composed of a small number of the pixels and its displaying area is also small (e.g. the same size as one pixel), the second mechanical shutters, which are not each located at the central area of (the displaying area of) one of the small images but each located at the central area (central portion) of one of the sections (e.g. the same size as four pixels) in which a plurality of the small images are arranged in a dispersion state, may serve as the second mechanical shutters that are each common to all the small images in one of the sections (i.e. the second mechanical shutters may be fixed).

INDUSTRIAL APPLICABILITY

The range of applications of the stereoscopic image display device and method of the present invention can be widened from the still image displaying to the moving image displaying, and the stereoscopic image display device and method can contribute to achieve the stereoscopic television and stereoscopic image providing service. The stereoscopic image display device and method have applicability as a stereoscopic image display device for video game machines and for medical use and as a stereoscopic image display method in game arcades, amusement parks, movie theaters, medical practice, or else.

REFERENCE SIGNS LIST

10: stereoscopic image display device, 11: display, 12a to 12d: small image, 13: section, 14: minute image, 16: shutter panel, 17: first mechanical shutter, 17a: minute opening portion, 23: image forming panel, 24: second mechanical shutter (image forming means), 24a: minute opening portion, 25: display image operation means, 26: first mechanical shutter operation means, 27: second mechanical shutter operation means, 28: small image making means, 30: control unit, 31: section, 32a to 32d: small image, 33: image forming panel, 50: three-dimensional object (object), 51: light-blocking panel, 52a to 52c: pinhole, 53: light-sensitive film, 54 to 56: object point, 54a to 54c, 55a to 55c, 56a to 56c: light ray, 57a to 57c, 58a to 58c, 59a to 59c: minute image, 60a to 60c: small image

The invention claimed is:

1. A stereoscopic image display device comprising:
a display having a displaying surface divided into a plurality of sections, each of the sections including a plurality of small images displayed, each of the small images having a plurality of preset minute images;
a shutter panel disposed in front of the display, the shutter panel including a plurality of first mechanical shutters arranged side by side in units of the minute image, the first mechanical shutters time-divisionally dividing each of the sections per each of the small images by switching on and off in units of the minute image; and
an image forming panel including a plurality of second mechanical shutters arranged side by side as image forming means, each of the second mechanical shutters switching a minute opening portion on and off, the second mechanical shutters forming an image from light rays from each of the small images, the light rays from each of the small images passing through the first mechanical shutters when the first mechanical shutters are on,
wherein each of the small images forms a part of a stereoscopic image to be displayed, one of the second mechanical shutters is provided for each of the small images, displaying areas of the small images displayed in each of the sections are partially overlapped on each other, while the minute images are arranged in a manner where a set of the minute images forming one of the small images does not overlap on any one of the other sets of the minute images forming the other ones of the small images, and each of the second mechanical shutters is on an axis passing through a central area of a corresponding one of the small images.

2. The stereoscopic image display device set forth in claim 1, wherein each of the minute images is composed of one of pixels of the display.

3. The stereoscopic image display device set forth in claim 1, wherein each of the minute images is composed of an assemblage of the pixels of the display.

4. The stereoscopic image display device set forth in claim 1, wherein the on and off of the first mechanical shutters corresponding to each other among the sections are synchronized.

5. A stereoscopic image display method comprising:
dividing a displaying surface of a display into a plurality of sections;
displaying a plurality of small images in each of the sections, the small images each having a plurality of preset minute images;
time-divisionally dividing each of the sections per each of the small images by switching a plurality of first mechanical shutters on and off in units of the minute image, the first mechanical shutters arranged on a shutter panel disposed in front of the display, the first mechanical shutters arranged in units of the minute image; and
forming an image from light rays from each of the small images by using a plurality of second mechanical shutters arranged side by side as image forming means on an image forming panel, each of the second mechanical shutters switching a minute opening portion on and off, the light rays from each of the small images passing through the first mechanical shutters when the first mechanical shutters are on,
wherein each of the small images forms a part of a stereoscopic image to be displayed, one of the second mechanical shutters is provided for each of the small images, displaying areas of the small images displayed in each of the sections are partially overlapped on each other, while the minute images are arranged in a manner where a set of the minute images forming one of the small images does not overlap on any one of the other sets of the minute images forming the other ones of the small images, and each of the second mechanical shutters is on an axis passing through a central area of a corresponding one of the small images.

6. The stereoscopic image display method set forth in claim 5, wherein each of the minute images is composed of one of pixels of the display.

7. The stereoscopic image display method set forth in claim 5, wherein each of the minute images is composed of an assemblage of the pixels of the display.

8. The stereoscopic image display method set forth in claim 5, wherein the on and off of the first mechanical shutters corresponding to each other among the sections are synchronized.

* * * * *